United States Patent [19]

Quakenbush

[11] 4,037,872
[45] July 26, 1977

[54] CONVERTIBLE SEAT-BED

[75] Inventor: Howard M. Quakenbush, Apple River, Ill.

[73] Assignee: Flexsteel Industries, Inc., Dubuque, Iowa

[21] Appl. No.: 642,735

[22] Filed: Dec. 22, 1975

Related U.S. Application Data

[63] Continuation-in-part of Ser. No. 602,203, Aug. 6, 1975, Pat. No. 3,913,152, which is a continuation-in-part of Ser. No. 402,860, Oct. 2, 1973.

[51] Int. Cl.² .............................................. A47C 17/14
[52] U.S. Cl. ......................................... 297/65; 5/44 B
[58] Field of Search ..................... 5/12, 13, 16, 27, 28, 5/29, 37 R, 42, 44 R, 44 B; 297/63–67, 92

[56] References Cited

U.S. PATENT DOCUMENTS

| 2,142,578 | 1/1939 | Vallone ................................. 5/44 B |
| 2,243,882 | 6/1941 | Pink et al. ............................. 5/44 B |
| 2,731,650 | 1/1956 | Gopert .................................. 5/44 B |
| 3,282,625 | 11/1966 | Logan .................................... 297/65 |

Primary Examiner—Casmir A. Nunberg
Attorney, Agent, or Firm—Brezina & Lund

[57] ABSTRACT

A seat-bed unit is provided in which at each end, first and second arms are respectively pivotal on a first stationary axis close to a floor and a second stationary axis behind the first axis and preferably spaced upwardly from the floor. The rearward end of a seat frame and the lower end of a back frame are pivotally connected to each other and to the upper end of the first arm, while a connection is provided between the back frame and the upper end of the second arm, preferably including a short link which is pivotally connected at its forward end to the back frame and at its rearward end to the upper end of the second arm. Preferably, a second link is provided between intermediate portions of the first and second arms with stop pins on the first and second arms engagable with the second link. A third arm is preferably provided, connected to the seat frame in a manner to swing from a rearwardly and upwardly inclined position in a seating condition of the unit to a forwardly and upwardly inclined position in a bed condition of the unit.

9 Claims, 4 Drawing Figures

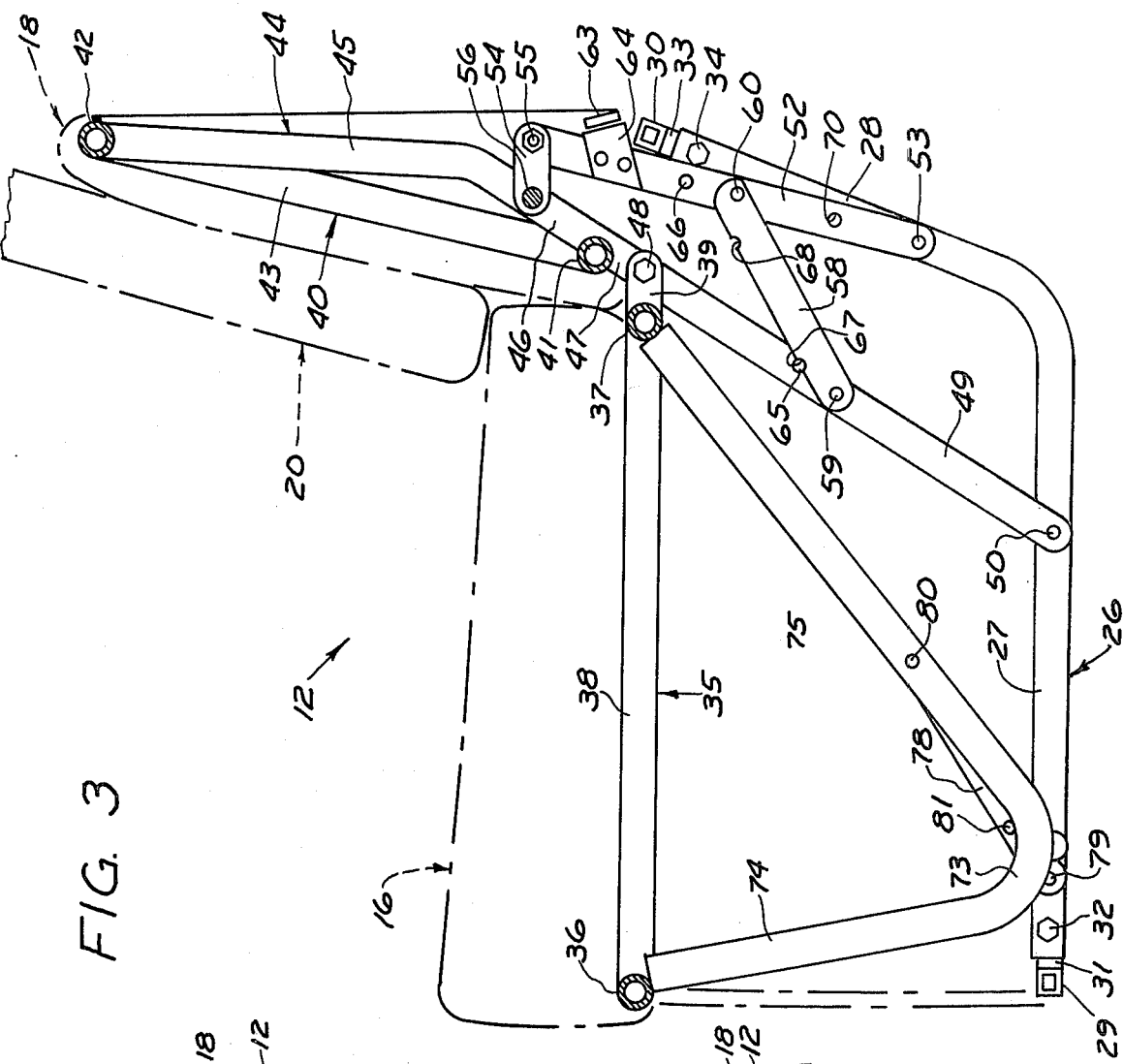
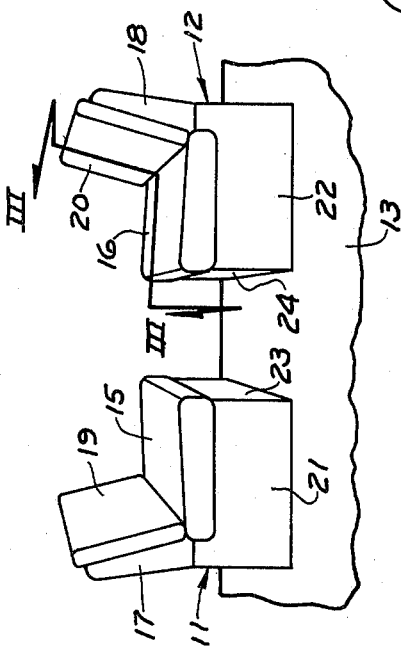
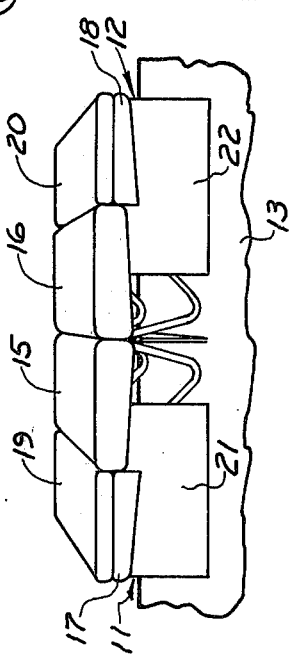

CONVERTIBLE SEAT-BED

This application is a continuation-in-part of my copending application, Ser. No. 602,203, filed Aug. 6, 1975, now U.S. Pat. No. 3,913,152 which is a continuation-in-part of my prior application, Ser. No. 402,860, filed Oct. 2, 1973.

The invention relates to a seat-bed construction and more particularly to a construction which permits a high degree of efficiency in the utilization space, as in campers or mobile vehicles, and which is rugged in construction and highly reliable while being comparatively simple and economical with respect to manufacture thereof.

BACKGROUND OF THE PRIOR ART

In my aforesaid application, Ser. No. 402,860, I disclose a convertible seat-bed unit in which a back is moved from an inclined position downwardly to a position behind a seat, the seat being moved forwardly and the back and the seat then having upper surfaces substantially in a common horizontal plane for use as a bed. As also disclosed, a linkage arrangement is provided for effecting the proper conjoint movement of the seat and the back in a manner such that the top edge portion of the back is moved substantially in a vertical path, which is especially advantageous in camper vehicles or the like in that the supporting frame of the unit can be rigidly secured to the frame of the vehicle.

In my aforesaid application, Ser. No. 602,203, I disclose improvements, including the provision of a construction such that operating parts of the mechanism are behind and below the back of the unit, rather than on the outside, and the provision of a pair of units arranged so that when the seats if both units are moved forwardly, the forward edges thereof are brought into a position adjacent each other. In camper-type vehicles, a dinette table may be removably disposed between the two units.

SUMMARY OF THE INVENTION

This invention was evolved with the general object of improving upon the constructions as disclosed in my aforesaid prior applications.

A specific object of the invention is to provide a construction in which operating parts are below and behind a back of the unit and in which a comparatively small number of parts are required with simple pivotal connections such as to provide a unit which is economically manufacturable.

Another specific object is the provide a unit which is readily operated while being rugged and reliable, providing safe and secure support for users of the unit.

In accordance with the invention, first and second arms are provided which are respectively pivotal on a first stationary axis close to the floor and a second stationary axis behind the first axis and preferably spaced upwardly from the floor. A connection is provided between a rearward end of a seat frame and the lower end of a back frame and the upper end of the first arm, preferably in the form of a common pivotal connection, and a second connection is provided between the back frame and the upper end of the second arm which preferably includes a short link which is pivotally connected at its forward end to the back frame and at its rearward end to the upper end of the second arm. The connections are such that when the seat is moved forwardly, the back pivots downwardly to reach a position in which the upper surface of the back is in a horizontal plane. Also, the upper end of the back, during such movement may move in a substantial vertical path.

The connections are also that the mechanism is located behind and below the back and seat frames rather than on the outside.

A specific feature is in the provision of a second link between intermediate portions of the first and second arms to define the relationship between the movements of such arms. Preferably, and in accordance with a further specific feature, stop pins are provided on the first and second arms engagable with the second link to limit movement of the arms and to provide secure and reliable support of the seat and back.

Another specific feature is in the provision of a third arm pivotal about a stationary axis close to the floor and pivotally connected to the seat frame in a manner to swing from a rearwardly and upwardly inclined position in a seating condition of the unit and a forwardly and upwardly inclined position in a bed condition of the unit. The third arm insures easy and reliable operation of the unit between its two conditions annd may preferably move to an over-center position to aid in securely holding the unit in its seating condition.

A single unit may be used alone, with the length of the seat and back being approximately equal to the height of a person to sleep thereon. Alternatively, two units may be disposed in facing relation with a spacing such that the forward edges of the seats are contiguous to each other in the bed positions of the units in which case, the combined widths of the two seats and two backs may be approximately equal to the height of a person to sleep thereon and in which case the lengths of the seats and backs may be shorter, if desired.

This invention contemplates other objects, features and advantages which will become more fully apparent from the following detailed description taken in conjunction with the accompanying drawings.

BRIEF DESCRIPTION OF THE DRAWINGS

FIG. 1 is a perspective view of a convertible seat-bed assembly constructed in accordance with the invention and shown in a seating condition;

FIG. 2 is a view similar to FIG. 1, but showing the assembly in a bed condition;

FIG. 3 is a sectional view, taken substantially along line III—III of FIG. 1, and showing support and linkage structure at one end of one unit of the assembly.

Figure 4:
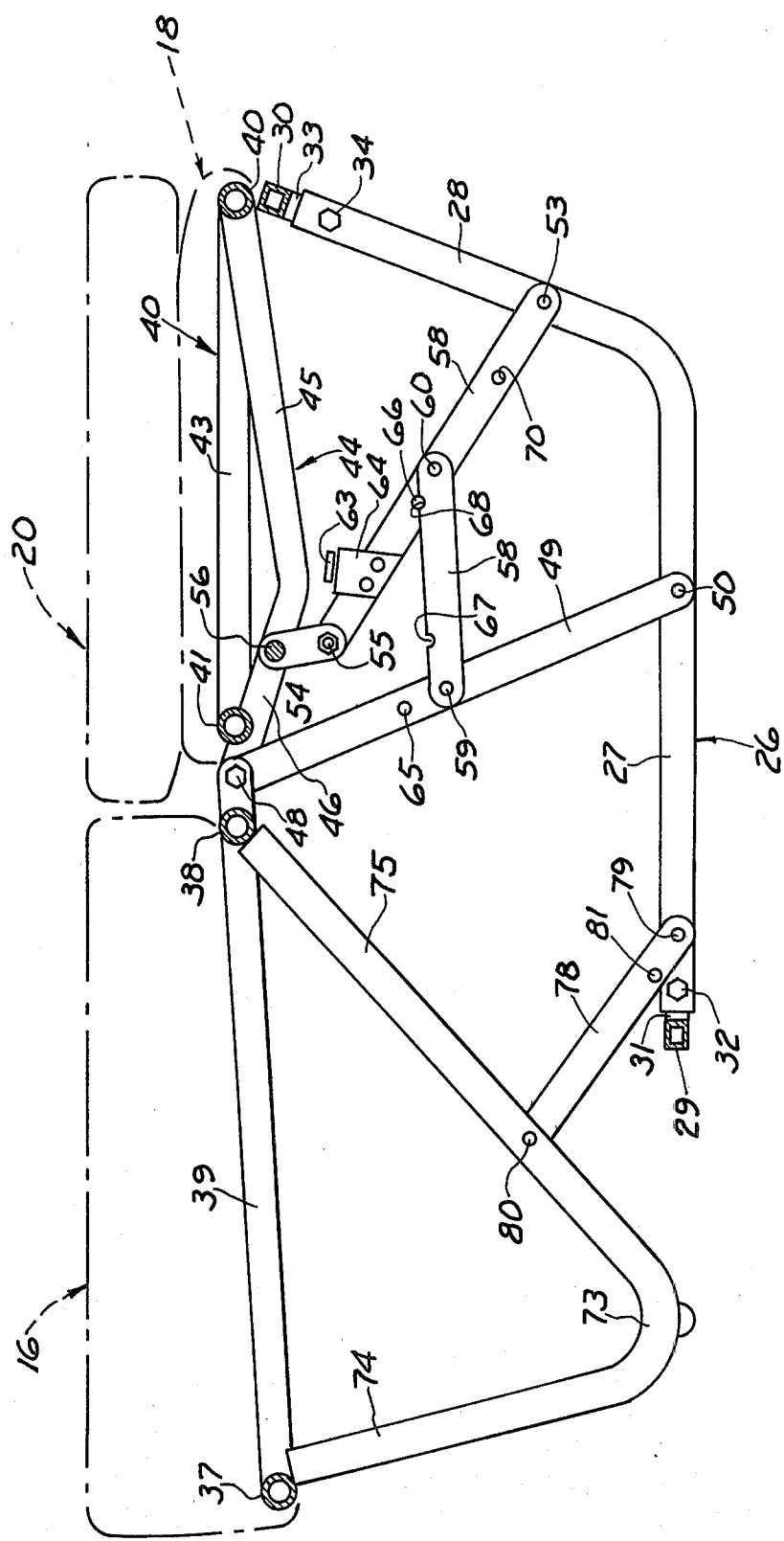
FIG. 4 is a view similar to FIG. 3 but illustrating the parts in a bed position.

Reference numeral 10 generally designated a seat-bed assembly constructed in accordance with the principles of this invention. In the illustrated arrangement, two seat-bed units 11 and 12 are provided in facing relation, secured to a floor 13 which may, for example, be the floor of a camper-type vehicle. The units 11 and 12 include seats 15 and 16 a abd backs 17 and 18 movable from a seating condition illustrated in FIG. 1 to a bed condition illustrated in FIG. 2. In the seating condition of FIG. 1, the backs 17 and 18 project upwardly and slightly rearwardly from rearward edge portions of the seats 15 and 16. In the bed condition of FIG. 2, the forward edges of the seats 15 and 16 are contiguous to each other and the upper surfaces of the seats 15 and 16 and backs 17 and 18 are in horizontal planes. Cushions 19 and 20 may be disposed against the backs 17 and 18 and in the bed condition of FIG. 2, the upper surfaces of the cushions 19 and 20 are substantially in the horizontal plane of the upper surfaces of the seats 15 and 16.

A dinette table (not shown) may be disposed between the units 11 and 12 in the condition of FIG. 1, and removed when the bed condition is desired as shown in FIG. 2

A pair of vertical walls 21 and 22 may be provided between the floor 13 and the lower extents of the seats and backs, providing side walls for the units which obscure from view the support and operating mechanisms of the units in the seating condition. A pair of front panels or skirts 23 and 24 are provided on the units 11 and 12, extending downwardly from forward edge portions of the seats 15 and 16 and movable therewith.

FIG. 3 is a sectional view taken substantially along line III—III of FIG. 2, illustrating portions of linkages at one end of the unit 12, similar structures and linkages being provided at the opposite end of the unit 12 and at the ends of the unit 11.

A main frame structure is provided including a tubular end member 26 having a horizontal portion 27 adapted to rest against the floor and a portion 28 extending angularly upwardly and rearwardly from the rearward end of the portion 27. The end member 26 is connected to a similar end member at the opposite end of the unit 12 by a pair of square hollow bars 29 and 30, a fitting 31 on the end of bar 29 being inserted in the forward end of the horizontal portion 27 of the member 26 and being secured thereto by a bolt 32 while a similar setting 33 on the end of the bar 30 is inserted in the end of the portion 28 and secured thereto by a bolt 34.

A frame structure 35 is provided for the seat 16 including parallel horizontal front rear tubular members 36 and 37 having ends rigidly secured to and connected by an end bar 38. An extension tab 39, secured to the tubular frame member 37, extends rearwardly to form a rear hinge portion of the seat. A frame structure 40 is provided for the back 18 including parallel tubular members 41 and 42 connected by an end bar 43 with an additional bar 44 being secured to the bar 43. Bar 44 has angularly related portions 45 and 46 and in the position illustrated in FIG. 3, the portion 45 is generally vertical while the portion 46 extends angularly downwardly and forwardly. An additional portion 47 extends downwardly and forwardly from the portion 46 as an extension thereof.

The rearward end of the seat frame structure 35 and the lower end of the back frame structure 40 are pivotally connected by a bolt 48 having a shank portion extending through the rear extension tab 39 and the lower terminal end of the portion 47 of bar 44. In the illustrated arrangement, bolt 48 also extends through the upper end of a swing arm 49 to provide a pivotal connection of both the seat and back frame structures to the arm 49. The lower end of the swing arm 49 is pivotally connected by a pin 50 to the horizontal portion 27 of the frame member 26.

Another swing arm 52 is provided which has a lower end pivotally connected through a pin 53 to the portion 28 of the end member 26 of the main frame. A connection is provided between the upper end of the arm 52 and the back frame structure 40, permitting relative pivotal movement thereof. In the illustrated construction, a short link 54 is provided, having a rearward end pivotally connected to the upper end of the arm 52 through a bolt 55 and having a forward end pivotally connected to the portion 46 of the member 44 of the back frame, through a rod 56. One end of rod 56 is welded or otherwise rigidly secured to link 54 and the other end thereof is similarly rigidly secured to a corresponding link at the opposite end of the unit. Rod 56 serves a timing function, keeping such links at the same angular positions at all times. Preferably, an additional link 58 is provided to connect the arms 49 and 52, the forward end of the link 58 being connected to an intermediate point on the arm 49 through a pin 59 and the rearward end of the link 58 being connected to the arm 52 through a pin 60.

With mechanism as thus far described, forward movement of the lower portion of the back will result in movement of the back frame 40 from the seating position of FIG. 3 in which the frame member 43 is inclined upwardly and rearwardly, to the bed position of FIG. 4, in which the frame member 43 is generally horizontal. In such movement, the upper end of the back 18, through which the frame member 42 extends, moves in a substantially vertical path. It is noted that a back panel 62 of a flexible fabric material or the like may be connected between the frame member 42 and a bar 63 which is secured at one end to the arm 52 through a bracket 64, the opposite end of the bar 63 being secured to a corresponding arm at the opposite end of the unit.

The link 58 in addition to connecting the arms 49 and 52 to define the relationship between the movements thereof, also cooperates with pins 65 and 66 on the arms 49 and 52 to limit movement of the linkage and to provide more firm support for the seat and back frame structures, the pin 65 being engaged in a notch 67 of the link 58 in the seating position of FIG. 3 and the pin 66 being engaged in the notch 68 in the bed position of FIG. 4. To assist movement into the seating position, a coiled tension spring, not shown, may be provided between an opening 70 in the arm 52 and the rear frame bar 30.

For support of the seat in both positions a frame member 72 is provided, preferably a tubular member having a curved intermediate portion 73, a portion 74 extending upwardly and forwardly from the portion 73 to the frame member 37 and a portion 75 extending rearwardly and upwardly from the portion 73 to the frame member 38. A bumper member 76 of rubber or the like may be secured on the underside of the curved portion 73 for engagement with the floor.

Preferably, the path of movement of the seat is defined by providing an arm 78 having a lower end connected to portion 27 of the frame member 26 through a pin 79 and having an upper end connected to the portion 75 of the member 72 through a bolt or pin 80. In the seating position, the arm 78 is inclined rearwardly, while in the bed position of FIG. 4, it is inclined forwardly. A stop pin 81 on the arm 78 engages the upper surface of the horizontal portion 27 of member 26 in the position of FIG. 4. With the arm 78 being provided, the initial movement of the forward end of the seat, when moving from the seating positions to the bed position, is upwardly as well as forwardly. Similarly, the initial movement of the forward end of the seat, when moving from the bed position toward the seating position, is upwardly as well as rearwardly. Such movements are desirable in insuring ease of operation of the unit. It is also noted that the arm 78 prevents the seat from being lifted to an extreme upward position. It is further noted that in the seating position, the axis of the pin 80 is slightly over-center with respect to a line through the axes of pins 79 and 48, to more firmly hold the assembly in the seating condition. In addition, a positive lock means, not shown, is preferably provided for more securely locking the mechanism in the seating condition.

It is noted that the parts of the assembly are relatively few in number and that they are such that they can be readily and economically manufactured and assembled through the use of a simple pivoted connections. At the same time, the unit is easily operated between its two conditions and the back and seat are securely and reliably supported in both conditions. The operating parts are behind and below the back and seat support structures, just inside the opposite ends of the unit, leaving the space therebetween open for storage.

It will be understood that modifications and variations may be effected without departing from the spirit and scope of the novel concepts of this invention.

I claim as my invention:

1. In a convertible seat-bed assembly, a base structure, a seat support structive for a generally rectangular seat, a back support structure for a generally rectangular back, means providing a first pivotal connection between a rearward portion of said seat support structure and a lower portion of said back support structure for relative pivotal movement of said structure about a first horizontal axis, a first arm means, means providing a second pivotal connection between an upper end of said first arm means and said seat and back support structures on a second horizontal axis with there being not more than a short distance between said first and second horizontal axes, means providing a pivotal connection between a lower end portion of said first arm means and said base structure for pivotal movement of said first arm means about a third horizontal axis, second arm means, means providing a connection between an upper portion of said second arm means and said back support structure to provide relative pivotal movement about a fourth horizontal axis, means providing a pivotal connection between a lower portion of said second arm means and said base structure on a fifth horizontal axis, all of said axes being parallel to each other, said first arm means pivotal between a first position in which said first and second horizontal axes are spaced a substantial distance behind a vertical plane through said third axis and a second postion in which said first and second horizontal axes are spaced a substantial horizontal distance forwardly from a vertical plane through said third horizontal axis, said second arm means being pivotal between a first position in which said fourth axis is behind and above said first and second axes and a second position in which said fourth axis is behind and below said first and second axes, said assembly being in a seating condition when said first and second arm means are in said first and second positions thereof and being in a bed condition when said first and second arm means are in said second positions thereof, said seat support structure being moved forwardly and said back support structure being pivotal about said first axis downwardly and backwardly relative to said seat support structure during operation of said assembly from said seating condition to said bed condition.

2. In an assembly as defined in claim 1, link means, means providing a pivotal connection between a forward end portion of said link means and an intermediate portion of said first arm means on a sixth horizontal axis, and means providing a pivotal connection between a rearward end portion of said link means and an intermediate portion of said second arm means on a seventh horizontal axis.

3. In an assembly as defined in claim 2, said seventh horizontal axis being spaced behind and above said sixth horizontal axis in said first positions of said first and second arm means and being spaced behind said sixth axis in generally horizontal alignment therewith in said second positions of said first and second arm means.

4. In an assembly as defined in claim 1, said fifth horizontal axis being spaced rearwardly and upwardly from said third horizontal axis.

5. In an assembly as defined in claim 1, said connection between said upper portion of said second arm means and said back support structure including a short link means connected to said upper portion of said second arm means on said fourth horizontal axis and connected at the other end to said back support structure on an axis spaced forwardly from said fourth horizontal axis in said first positions of said arm means.

6. In an assembly as defined in claim 1, said first and second axes being coincident.

7. In an assembly as defined in claim 1, third arm means having a lower end pivotal about a horizontal axis spaced forwardly from said third horizontal axis and having an upper end pivotally connected to said seat support structure, said third arm means being inclined rearwardly and upwardly in said first positions of said first and second arm means and being inclined forwardly and upwardly in said second positions of said first and second arm means.

8. In an assembly as defined in claim 7, the axis of pivotal connection between said upper end of said third arm means and said seat support structure being behind a line through said horizontal axis of pivotal movement of said third arm means and said second horizontal axis in said first position of said first arm means.

9. In a convertible seat-bed assembly, a base structure, a seat support structure for a generally rectangular seat, a back support structure for a generally rectangular back, linkage means for supporting said seat and back support sturcture from said base structure, means providing a first pivotal connection between a rearward portion of said seat support structure and said linkage means for relative pivotal movement of said seat support structure about a first horizontal axis, said linkage means comprising first arm means, means providing a second pivotal connection between an upper end of said first arm means and said seat and back support structures on a second horizontal axis, means providing a pivotal connection between a lower end portion of said first arm means and said base structure for pivotal movement of said arm means about a third horizontal axis, second arm means, means providing a connection between an upper portion of said second arm means and said back support structure to provide relative pivotal movement about a fourth horizontal axis, means providing a pivotal connection between a lower portion of said second arm means and said base structure on a fifth horizontal axis, all of said axes being parallel to each other, said first arm means being pivotal between a first position in which said second horizontal axis is spaced a substantial distance behind a vertical plane through said third axis and a second position in which said second horizontal axis is spaced a substantial horizontal distance forwardly from a vertical plane through said third horizontal axis, said second arm means being pivotal between a first position in which said fourth axis is behind and above said first and second axes and a second position in which said fourth axis is behind and below said first and second axes, said assembly being in a seating condition when said first and second arm means are in said first and second positions thereof and being in a bed condition when said first and second arm means are in said second position thereof, said seat support structure being moved forwardly and said back support structure being tilted downwardly and backwardly during operation of said assembly from said seating condition to said bed condition, link means, means providing a pivotal connection between a forward end portion of said link means and an intermediate portion of said first means on a sixth horizontal axis, and means providing a pivotal connection between a rearward end portion of said link means and an intermediate portion of said second arm means on a seventh horizontal axis, said seventh horizontal axis being spaced behind and above said sixth horizontal axis in said first positions of said first and second arm means and being spaced behind said sixth axis in generally alignment therewith in said second positions of said first and second arm means.

* * * * *